(12) United States Patent
Moon et al.

(10) Patent No.: US 11,551,655 B2
(45) Date of Patent: Jan. 10, 2023

(54) SOUND ABSORPTION STRUCTURE AND METHOD OF MANUFACTURING THE SAME

(71) Applicant: KOREA INSTITUTE OF SCIENCE AND TECHNOLOGY, Seoul (KR)

(72) Inventors: Myoung-Woon Moon, Seoul (KR); O Chang Kwon, Seoul (KR); Young A Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 507 days.

(21) Appl. No.: 16/710,374

(22) Filed: Dec. 11, 2019

(65) Prior Publication Data
US 2020/0193952 A1      Jun. 18, 2020

(30) Foreign Application Priority Data
Dec. 12, 2018   (KR) .................. 10-2018-0160337

(51) Int. Cl.
    *G10K 11/168*      (2006.01)
    *B32B 5/12*         (2006.01)
    *B32B 7/02*         (2019.01)

(52) U.S. Cl.
    CPC .............. *G10K 11/168* (2013.01); *B32B 5/12* (2013.01); *B32B 7/02* (2013.01)

(58) Field of Classification Search
    CPC ... G10K 11/16–1752; B32B 7/00–7/14; B32B 3/00–3/30; B32B 5/00–5/32
    See application file for complete search history.

(56) References Cited

U.S. PATENT DOCUMENTS

| 2012/0228051 | A1* | 9/2012 | Drevon ................. G10K 11/172 156/292 |
| 2018/0182369 | A1* | 6/2018 | Ravise ...................... B64C 7/02 |
| 2019/0066648 | A1* | 2/2019 | Won ..................... G10K 11/172 |

FOREIGN PATENT DOCUMENTS

| JP | 2015-215428 A | 12/2015 |
| KR | 10-2018-0017582 A | 2/2018 |

OTHER PUBLICATIONS

Bravo et al. "Enhancing sound absorption and transmission through flexible multi-layer microperforated structures", The Journal of the Acoustical Society of America 134, (2013); pp. 3663-3673.*

* cited by examiner

*Primary Examiner* — Prashant J Khatri
(74) *Attorney, Agent, or Firm* — Rabin & Berdo, P.C.

(57) ABSTRACT

A sound absorption structure and a method of manufacturing the same are provided. The sound absorption structure includes a first sound absorption layer comprising first elements of which longitudinal directions are misaligned in a thickness direction of the sound absorption structure, the first sound absorption layer having a first internal filling density and absorbing sound waves of a first reactance frequency; and a second sound absorption layer disposed on the first sound absorption layer, having a second internal filling density different from the first internal filling density, and absorbing sound waves of a second reactance frequency different from the first reactance frequency.

13 Claims, 14 Drawing Sheets

SOUND ABSORPTION STRUCTURE AND METHOD OF MANUFACTURING THE SAME

CROSS-REFERENCE TO RELATED APPLICATION

This application claims the benefit of Korean Patent Application No. 10-2018-0160337, filed on Dec. 12, 2018, in the Korean Intellectual Property Office, the disclosure of which is incorporated herein in its entirety by reference.

BACKGROUND

1. Field

One or more embodiments relate to a sound absorption structure capable of adjusting a sound absorption characteristic by adjusting an internal filling and a method of manufacturing the same.

2. Description of the Related Art

Methods of adjusting sound are largely classified into sound reflection, sound absorption, and sound diffusion. The sound absorption method uses a structure such as a sponge or a nonwoven fabric having 90% or more pores therein, or fabricates a micro-sized resonator capable of reacting in a specific center frequency band to adjust sound absorption performance and frequency range.

Sponge and nonwoven fabrics, which are common sound absorption materials, adjust porosity to match an impedance value of air with an impedance value of a sound absorption structure, or increase the thickness of a material to improve the sound absorption performance in a broadband frequency.

In order to improve the sound absorption performance at a specific frequency, a resonator is manufactured and used on a surface of the material. The resonator is mainly manufactured on a surface of the sound absorption structure due to manufacturing limitations, and is not disposed in the thickness direction of the sound absorption structure.

SUMMARY

One or more embodiments include a sound absorption structure capable of adjusting an internal filling density and a method of manufacturing the same.

One or more embodiments include a sound absorption structure with sound absorption performance over a wide frequency band by cascading an internal filling density and a method of manufacturing the same.

Additional aspects will be set forth in part in the description which follows and, in part, will be apparent from the description, or may be learned by practice of the presented embodiments of the disclosure.

According to one or more embodiments, a sound absorption structure includes a first sound absorption layer comprising first elements arranged in which longitudinal directions thereof are misaligned in a thickness direction of the sound absorption structure, having a first internal filling density, and absorbing sound waves of a first reactance frequency; and a second sound absorption layer disposed on the first sound absorption layer, having a second internal filling density different from the first internal filling density and absorbing sound waves of a second reactance frequency different from the first reactance frequency.

The first elements arranged perpendicularly to the thickness direction of the sound absorption structure among the first elements may be arranged in parallel to each other.

The first elements arranged perpendicularly to the thickness direction of the sound absorption structure among the first elements may be spaced apart from each other.

The first elements arranged perpendicularly to the thickness direction of the sound absorption structure among the first elements may have the longitudinal directions that sequentially change in the thickness direction of the sound absorption structure.

A degree of change in the longitudinal directions may be constant

A degree of change in the longitudinal directions may be 10 degrees or more and less than 150 degrees.

At least one of the first elements may have a bar shape.

The second sound absorption layer may include second elements arranged in which longitudinal directions thereof are misaligned in the thickness direction of the sound absorption structure.

A degree of which longitudinal directions of the second elements are misaligned may be different from a degree of which longitudinal directions of the first elements are misaligned.

At least one of a thickness, an arrangement interval, and a material of the first elements and the second elements may be different.

The first sound absorption layer may include a plurality of spiral or rectilinear pores in the thickness direction of the sound absorption structure, and the second sound absorption layer may include a plurality of spiral or rectilinear pores in the thickness direction of the sound absorption structure.

The sound absorption structure may further include a third sound absorption layer disposed on the second sound absorption layer and having a third internal filling density different from the first and second internal filling densities.

The third internal filling density may have a value between the first internal filling density and the second internal filling density.

According to one or more embodiments, a method of manufacturing a sound absorption structure includes forming a first sound absorption layer comprising first elements arranged in which longitudinal directions thereof are misaligned in a thickness direction of the sound absorption structure, having a first internal filling density, and absorbing sound waves of a first reactance frequency; and forming a second sound absorption layer disposed on the first sound absorption layer, having a second internal filling density different from the first internal filling density and absorbing sound waves of a second reactance frequency different from the first reactance frequency.

The forming of the first sound absorption layer may include arranging some of the first elements in parallel to each other in a direction perpendicular to the thickness direction of the sound absorption structure.

The forming of the first sound absorption layer may include arranging some of the first elements such that the longitudinal directions sequentially change in the thickness direction of the sound absorption structure.

A degree of change in the longitudinal directions may be constant

The second sound absorption layer may include second elements arranged in which longitudinal directions thereof are misaligned in the thickness direction of the sound absorption structure.

At least one of a thickness, an arrangement interval, and a material of the first elements and the second elements may be different.

At least one of the first sound absorption layer and the second sound absorption layer may be formed by a 3D printing technique.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
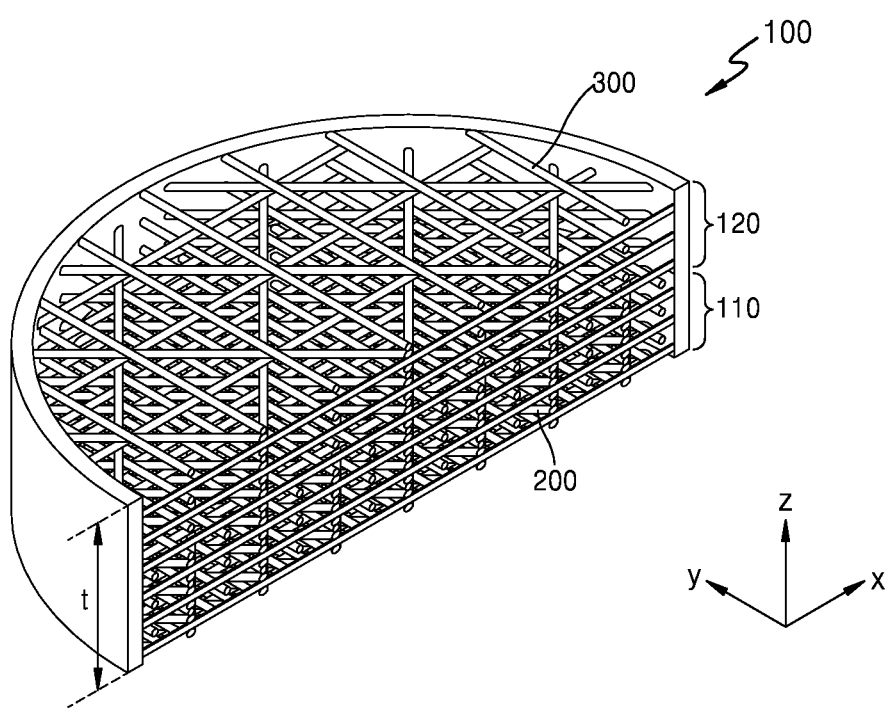
FIG. 1 is a diagram illustrating a sound absorption structure according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The terms used in the present specification are selected as general terms which are widely used in consideration of functions in the present disclosure, but these may vary depending on the intention of the technician working in the art, the precedent, the emergence of new technology or the like. Also, in certain cases, there may be a term arbitrarily selected by the applicant, in which case the meaning thereof will be described in detail in the corresponding description of the disclosure. Therefore, the term used in the present disclosure should be defined based on the meaning of the term, not on the name of a simple term, but on the entire contents of the present disclosure.

As used herein, the terms 'comprising' or 'including' and the like should not be construed as necessarily including the various elements or operations described in the specification, and it should be understood that some of the elements or some of the operations may not be included, or that additional elements or operations may be further included.

In the following, what is described as "upper" or "on" may include not only those in contact with and directly above, below, left, and right but also those in non-contact with and directly above, below, left, and right. Hereinafter, embodiments will be described in detail with reference to the accompanying drawings.

Although the terms "first", "second", etc., may be used herein to describe various components, these components should not be limited by these terms. These terms are only used to distinguish one component from another component.

FIG. 1 is a diagram illustrating a sound absorption structure 100 according to an embodiment. As illustrated in FIG. 1, the sound absorption structure 100 may include a first sound absorption layer 110 having a first internal filling density and a second sound absorption layer 120 disposed on the first sound absorption layer 110 and having a second internal filling density different from the first internal filling density. The internal filling density refers to a filling degree of a solid (hereinafter referred to as 'element') in an entire structure and is in inverse proportion to porosity. A sound absorption layer may be formed by a 3D printing technique. Because the sound absorption layer is formed by the 3D printing technique, there may be a pore even if the internal filling density is 100%.

The first sound absorption layer 110 may include first elements 200 with the first internal filling density, which may absorb sound waves in a first center frequency band. The first elements 200 may have a long bar shape and have the maximum thickness of about 200 μm or less. The first elements 200 may include polymer filament, gypsum, metal powder, etc. The first internal filling density may be determined according to the sizes of the first elements 200 and the arrangement interval of the first elements 200, the number of the first elements 200 in the longitudinal direction, a degree of change in an amount of material discharge from a nozzle, etc. The first internal filling density may be 10% or more and less than 100%. Preferably, the first internal filling density may be 10% or more and less than 80%.

Some of the first elements 200 may be arranged in a direction crossing each other. For example, the first elements 200 arranged in a thickness direction t of the sound absorption structure 100 may contact the adjacent first element 200. The first elements 200 arranged in the thickness direction t of the sound absorption structure 100 among the first elements 200 may be arranged in which the longitudinal directions thereof are misaligned. A longitudinal direction may mean a longitudinal direction of elements. Specifically, the first elements 200 arranged in the thickness direction t of the sound absorption structure 100 among the first elements 200 may have the longitudinal directions that sequentially change in the thickness direction t of the sound absorption structure 100. A degree of change in the longitudinal direction may be constant. Also, the degree of change in the longitudinal direction may be 10 degrees or more and less than 150 degrees.

Figure 2:
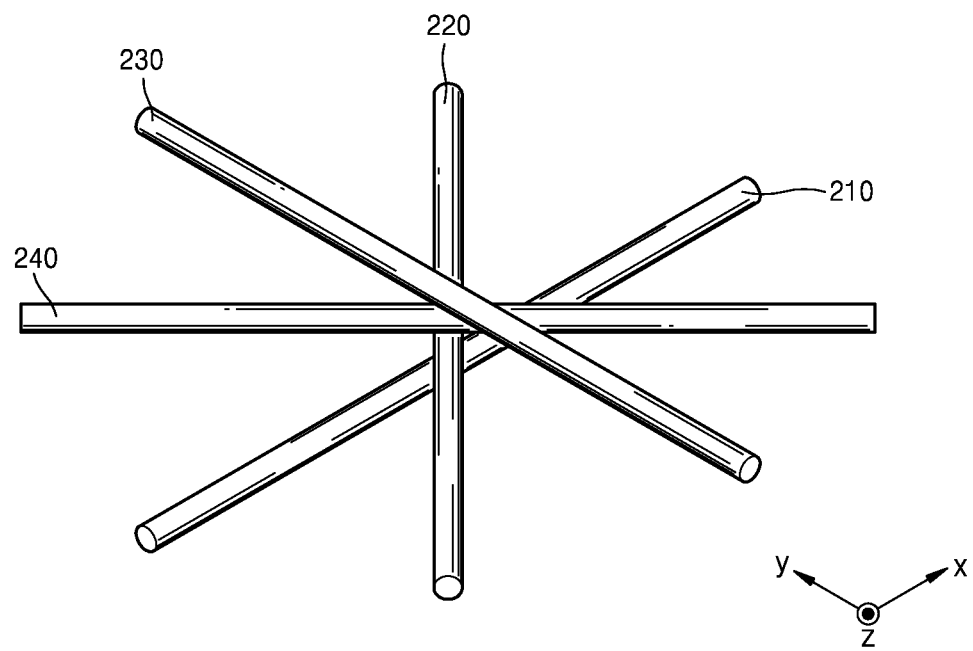
FIG. 2 is a diagram illustrating a relationship between first elements arranged in a thickness direction t of the sound absorption structure.

FIG. 2 is a diagram illustrating a relationship between the first elements 200 arranged in the thickness direction t of the sound absorption structure 100, and FIGS. 3A to 3D illustrate a relationship between the first elements 200 arranged in a direction perpendicular to the thickness direction t of the sound absorption structure 100 according to an embodiment. The first elements 200 arranged in the thickness direction t of the sound absorption structure 100 may have a longitudinal direction that sequentially change. The first elements 200 may be classified into 1-1th elements 210, 1-2th elements 220, 1-3th elements 230, and 1-4th elements 240 according to layers.

Figure 3A:
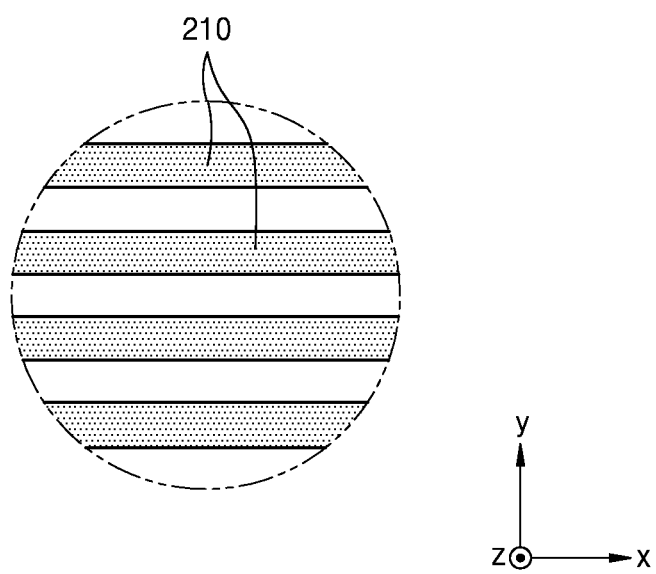
FIGS. 3A to 3D illustrate a relationship between first elements arranged in a direction perpendicular to a thickness direction of a sound absorption structure according to an embodiment.

Referring to FIGS. 2 and 3A, the 1-1th elements 210 of the first elements 200 may be arranged so that the longitudinal direction thereof is parallel to an X-axis direction. A direction in which the longitudinal direction of elements is parallel to the X-axis direction may be defined as a directional angle of 0 degree. Thus, the directional angle of the 1-1th elements 210 may be 0 degree. The 1-1th elements 210 may be spaced apart from each other.

Figure 3B:
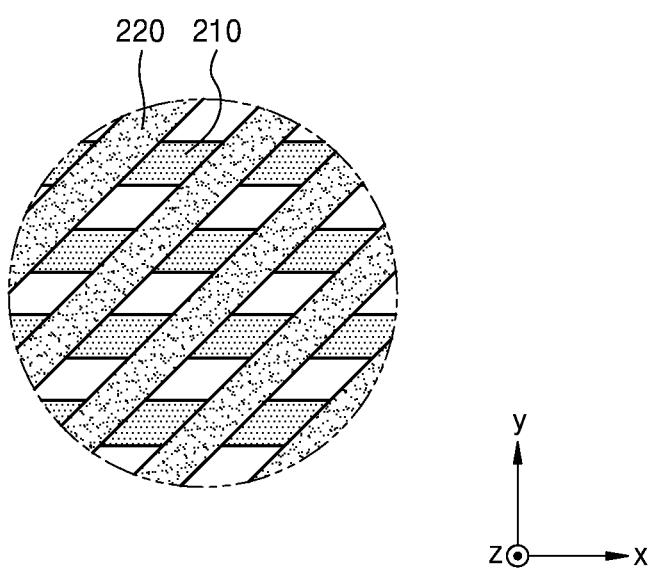

Referring to FIGS. 2 and 3B, the 1-2th elements 220 may be disposed on the 1-1th elements 210 in the thickness direction t of the sound absorption structure 100. One region of the 1-2th element 220 may be disposed in contact with one region of the 1-1th element 210. A length direction d2 of the 1-2th elements 220 may be misaligned with a length direction d1 of the 1-1th elements 210. For example, the directional angle of the 1-2th elements 220 may be 45 degrees. The 1-2th elements 220 may be spaced apart from each other.

Figure 3C:
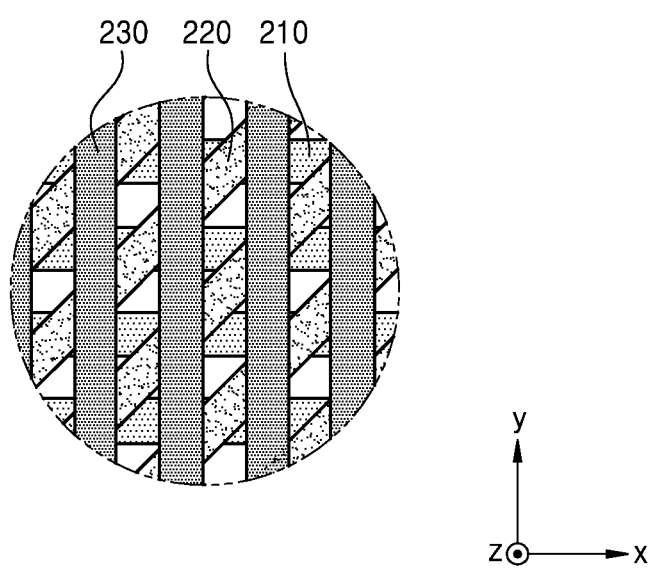

Referring to FIGS. 2 and 3C, the 1-3th elements 230 may be disposed on the 1-2th elements 220 in the thickness direction t of the sound absorption structure 100. One region of the 1-3th element 230 may be in contact with one region of the 1-2th element 220. A length direction d3 of the 1-3th elements 230 may be misaligned with the length direction d2 of the 1-2th elements 220. For example, the directional angle of the 1-3th elements 230 may be misaligned with the directional angle of 1-2th elements 220 by 45 degrees. That is, the directional angle of the 1-3th elements 230 may be 90 degrees. The 1-3th elements 230 may be spaced apart from each other.

Figure 3D:
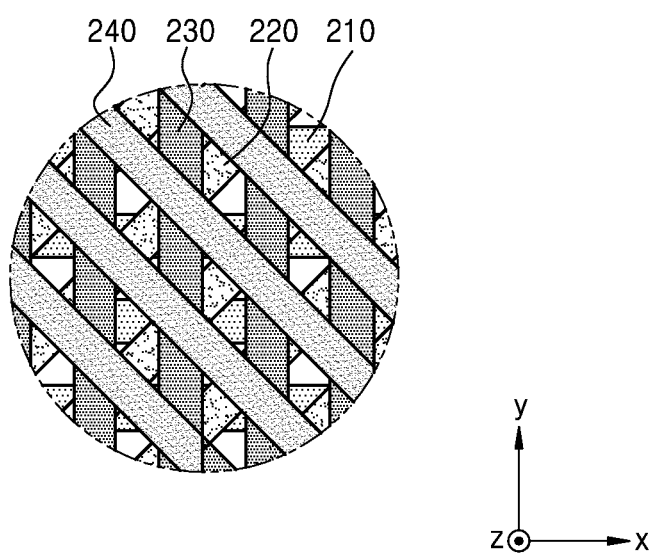

In the same manner, referring to FIGS. 2 and 3D, the 1-4th elements 240 may be disposed on the 1-3th elements 230 in the thickness direction t of the sound absorption structure 100. One region of the 1-4th element 240 may be in contact with one region of the 1-3th element 230. A length direction d4 of the 1-4th elements 240 may be misaligned with the length direction d3 of the 1-3th elements 230. For example, the directional angle of the 1-4th elements 240 may be misaligned with the directional angle of 1-3th elements 230 by 45 degrees. That is, the directional angle of the 1-4th elements 240 may be 135 degrees. The 1-4th elements 240 may be spaced apart from each other.

The 1-1th elements 210 to the 1-4th elements 240 according to an embodiment may repeat a plurality of times in the thickness direction t of the sound absorption structure 100. According to the arrangement of the 1-1th to 1-4th elements to the first to fourth elements 210, 220, 230, and 240, pores that change in a step or spiral may be formed in the first sound absorption layer 110 in the thickness direction t of the sound absorption structure 100. In other words, the pores formed by the 1-1th elements 210 overlap the pores formed by the 1-2th elements 220 partially in the thickness direction t and partially in the direction perpendicular to the thickness direction t. In addition, the pores formed by the 1-2th elements 220 overlap the pores formed by the 1-3th elements 230 partially in the thickness direction t and partially in the direction perpendicular to the thickness direction t.

The stepped or spiral pores may dissipate sound waves by converting the sound waves into thermal energy while interrupting a progress of the sound waves. The spiral pores may absorb sound waves in a broadband frequency.

In FIG. 2, the first elements 200 having the longitudinal direction changing by 45 degrees are described but are not limited thereto. The degree of change in the longitudinal direction may be set differently according to the center frequency of a sound wave to be absorbed. For example, the degree of change in the longitudinal direction may be 30 degrees or 60 degrees. Alternatively, although the degree of change in the longitudinal direction of the first elements 200 may be constant, it may not be constant. The first sound absorption layer 110 may have an internal filling density of 10% or more and less than 100%. Preferably, the first sound absorption layer 110 may have the internal filling density of 10% or more and less than 80%.

The second sound absorption layer 120 may include second elements 300 arranged to form a second internal filling density and may absorb the sound waves of a second center frequency band. The second elements 300 may have a long bar shape and have the maximum thickness of about 300 μm or less. The second elements 300 may include polymer filament, gypsum, metal powder, etc. The maximum thickness may be about 300 μm or less. The second internal filling density may be 10% or more and less than 100%. Preferably the second internal filling density may be 10% or more and less than 80%. The second element 300 may be different from the first element 200 in a thickness, an arrangement interval, a material, and a degree of change in the longitudinal direction.

Some of the second elements 300 may be arranged in a direction crossing each other. For example, the second elements 300 arranged in the thickness direction t may contact the second elements 300 adjacent to each other in the thickness direction t. The second elements 300 arranged in the thickness direction t of the sound absorption structure 100 among the second elements 300 may be arranged in which the longitudinal directions thereof are misaligned. Specifically, the second elements 300 arranged in the thickness direction t of the sound absorption structure 100 among the second elements 300 may have the longitudinal directions that sequentially change. The degree of change in the longitudinal direction may be constant. And, the degree of change in the longitudinal direction may be 90 degrees.

Figure 4A:
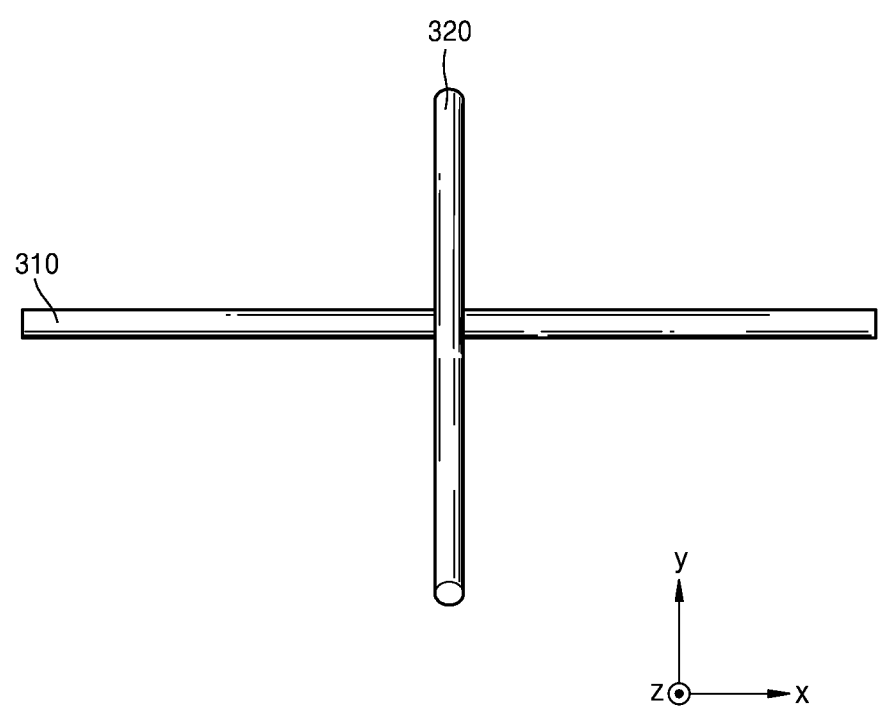
FIGS. 4A and 4B are diagrams illustrating an arrangement relationship of second elements according to an embodiment.
Figure 4B:
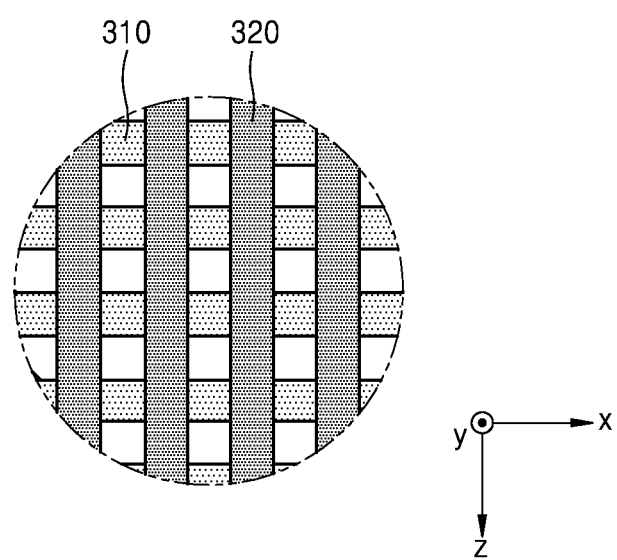

FIGS. 4A and 4B are diagrams illustrating an arrangement relationship of the second elements 300 according to an embodiment. As shown in FIGS. 4A and 4B, the second sound absorption layer 120 may include 2-1th elements 310 and 2-2th elements 320 which are different in a longitudinal direction in the thickness direction t of the sound absorption structure 100. The directional angle of the 2-1th elements 310 may be 0 degree, and the directional angle of the 2-2th elements 320 may be 90 degrees. The 2-1th elements 310 may be spaced apart from each other, and 2-2th elements 320 may be spaced apart from each other. The 2-1th elements 310 and the 2-2th elements 320 may repeat a plurality of times in the thickness direction t of the sound absorption structure 100.

Pores may be may be rectilinear by the 2-1th elements 310. Thus, the second sound absorption layer 120 may be simulated as a micro perforated plate (MPP). Because the rectilinear pore acts as a resonator, the sound absorption performance of sound waves in a specific frequency band may be further improved.

Figure 5A:
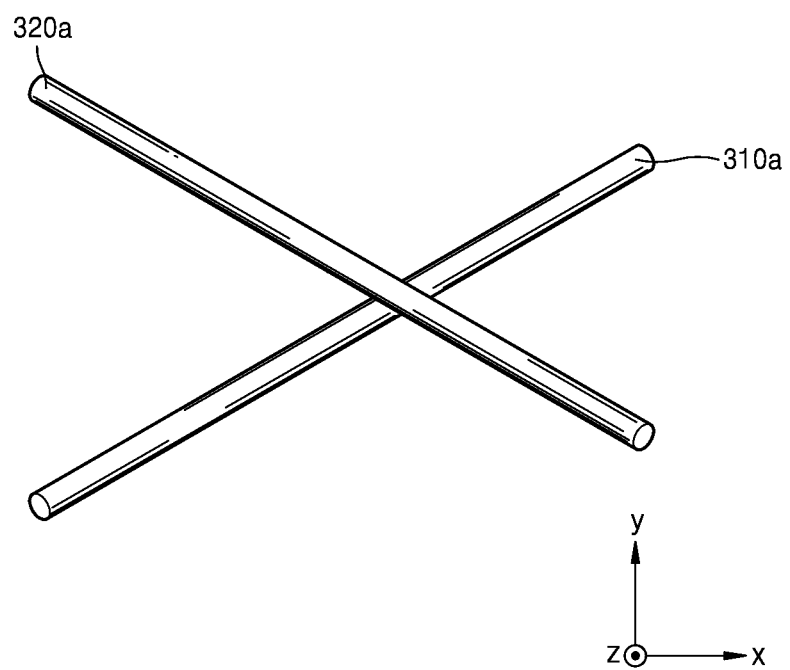
FIGS. 5A and 5B are diagrams illustrating an arrangement relationship of second elements according to another embodiment.
Figure 5B:
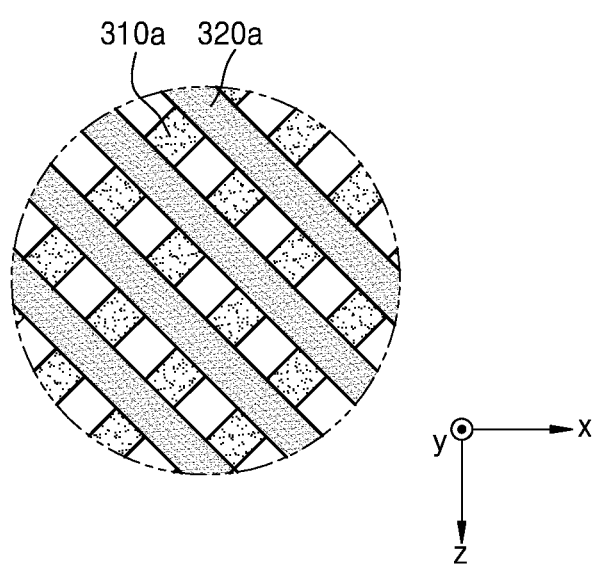

FIGS. 5A and 5B are diagrams illustrating an arrangement relationship of the second elements 300 according to another embodiment. As shown in FIGS. 5A and 5B, the second sound absorption layer 120 may include 2-3th elements 330 and 2-4th elements 340 which are different in the longitudinal directions d2 and d4 in the thickness direction t of the sound absorption structure 100. The directional angle of the 2-3th elements 330 may be 45 degrees, and the directional angle of the 2-4th elements 340 may be 135 degrees. The 2-3th elements 330 may be spaced apart from each other, and 2-4th elements 340 may be spaced apart from each other. The 2-3th elements 330 and the 2-4th elements 340 may repeat a plurality of times in the thickness direction t of the sound absorption structure 100.

Pores formed by the second elements 300 shown in FIGS. 5A and 5B may be may be rectilinear. Thus, the second sound absorption layer 120 may be simulated as a MPP. The second sound absorption layer 120 of FIGS. 4A and 4B and the second sound absorption layer 120 of FIGS. 5A and 5B are common in that they have the rectilinear pores.

FIG. 1 illustrates the sound absorption structure 100 including the first sound absorption layer 110 having spiral pores and the second sound absorption layer 120 including rectilinear pores. However, the embodiment is not limited thereto. The sound absorption structure 100 may include a plurality of sound absorption layers including spiral pores having different internal filling densities or may include a plurality of sound absorption layers including rectilinear pores having different internal filling densities. Alternatively, the sound absorption structure 100 including three or more sound absorption layers may be formed.

Figure 6:
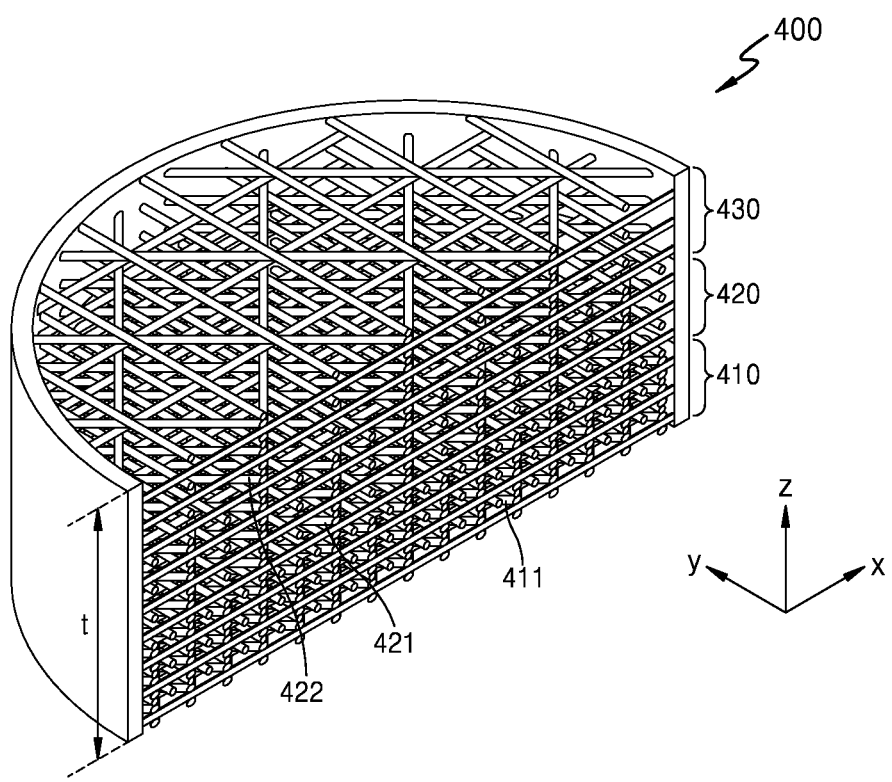
FIG. 6 is a diagram illustrating a sound absorption structure according to another embodiment.

FIG. 6 is a diagram illustrating a sound absorption structure 400 according to another embodiment. As illustrated in FIG. 6, the sound absorption structure 400 may include three sound absorption layers 410, 420, and 430 having different internal filling densities. The first to third sound absorption layers 410, 420, and 430 may be sequentially stacked. The inner filling density may gradually change from the first sound absorption layer 410 to the third sound absorption layer 430. For example, the internal filling density of the first sound absorption layer 410 may be the highest, and the internal filling density of the third sound absorption layer 430 may be the lowest. The internal filling density of the second sound absorption layer 420 may have a value between the internal filling density of the first sound absorption layer 410 and the internal filling density of the third sound absorption layer 430. However, the embodiment is not limited thereto. The internal filling density of the first sound absorption layer 410 may be the lowest, and the internal filling density of the third sound absorption layer 430 may be the highest. The internal filling density of the second sound absorption layer 420 may have a value between the internal filling density of the first sound absorption layer 410 and the internal filling density of the third sound absorption layer 430.

Alternatively, the inner filling densities of the first sound absorption layer 410 and the third sound absorption layer 430 may be the same, and the inner filling density of the second sound absorption layer 420 may be different. For example, the internal filling densities of the first and third sound absorption layers 410 and 430 may be higher than the internal filling densities of the second sound absorption layer 420. However, the embodiment is not limited thereto. The internal filling densities of the first and third sound absorption layers 410 and 430 may be lower than the internal filling densities of the second sound absorption layer 420. The first to third sound absorption layers 410, 420, and 430 may respectively include elements 411, 421, and 431 arranged to form a specific internal filling density.

A degree of change in the internal filling density may be determined differently according to the acoustic characteristic of a place used. For example, when sound waves of a specific frequency band are to be removed more efficiently, the inner filling density may be designed to gradually increase from the first sound absorption layer 410 to the third sound absorption layer 430. When both the sound waves traveling from the first sound absorption layer 410 to the third sound absorption layer 430 and the sound waves traveling from the third sound absorption layer 430 to the first sound absorption layer 410 are blocked, the internal filling densities of the first and third sound absorption layers 410 and 430 may be designed to be the same, and the internal filling density of the second sound absorption layer 420 may be differently designed.

Figure 7:
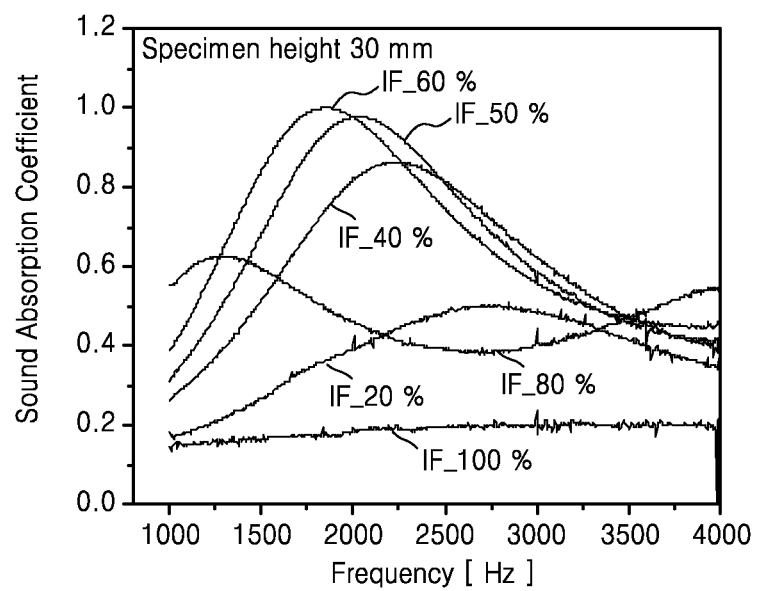
FIG. 7 is a diagram illustrating experimental results regarding sound absorption performance for each frequency according to an internal filling density.

FIG. 7 is a diagram illustrating experimental results regarding sound absorption performance for each frequency according to an internal filling density. Sound absorption structures having a thickness of 30 mm and internal filling densities of 20%, 40%, 50%, 60%, 80%, and 100%, respectively, are formed, and a relationship between the sound absorption performance and the frequency is measured using an impedance tube measurement method. In each of the sound absorption structures, elements of which degree of change in a longitudinal direction is adjusted are arranged to have a specific internal filling density. The maximum sound absorption performance of the sound absorption structure having the internal filling density of 20% is 0.5 at a frequency of 2800 Hz, and the sound absorption performance of the sound absorption structure having the internal filling density of 40% is about 0.85 at a frequency of 2300 Hz.

In addition, it is confirmed that the sound absorption performance of the sound absorption structure having the internal filling density of 50% is 0.97 at a frequency of 2100 Hz. In addition, the sound absorption performance of the sound absorption structure having the internal filling density of 60% is 1.0 at a frequency of 1600 Hz, and the sound absorption performance of the sound absorption structure having the internal filling density of 80% is 0.65 at a frequency of 1250 Hz. As described above, it may be confirmed that a center wavelength band of absorbed sound waves varies according to the internal filling density. In addition, it may be confirmed that the sound absorption performance varies according to the internal filling density. Therefore, the sound absorption structure may be manufactured by adjusting the internal filling density according to the center frequency of the sound waves to be absorbed. In particular, it may be confirmed that the sound absorption performance is excellent when the internal filling density is 40% or more and less than 80%. The sound absorption performance of FIG. 7 is the result of experimenting the sound absorption performance of the sound waves in the air. The sound absorption performance of the sound waves in water may be different, and it may be confirmed that the sound absorption performance in water is also excellent even when the internal filling density is 100%.

Figure 8:
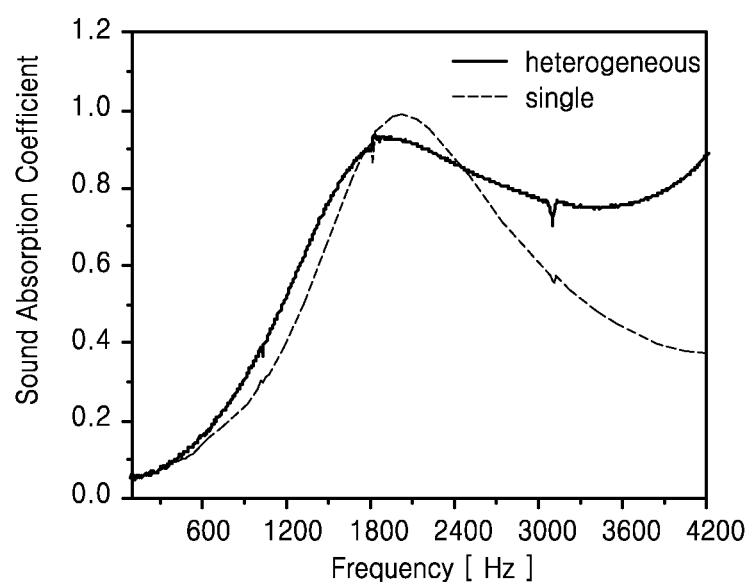
FIG. 8 is a diagram illustrating experimental results regarding the sound absorption characteristics of a single sound absorption structure and a heterogeneous sound absorption structure.

FIG. 8 is a diagram illustrating experimental results regarding the sound absorption characteristics of a single sound absorption structure and a heterogeneous sound absorption structure. In the heterogeneous sound absorption structure, sound absorption layers simulating an MPP are disposed at both ends of the sound absorption structure, and a sound absorption layer having an inner filling density of 50% and forming spiral pores is disposed in a center region of the sound absorption structure. The single sound absorption structure includes an inner filling density of 50% and forming spiral pores. The solid line in a graph represents the sound absorption performance of the heterogeneous sound absorption structure for each frequency, and the dotted line in the graph represents the sound absorption performance of the single sound absorption structure 100 for each frequency.

It may be confirmed that the heterogeneous sound absorption structure has a sound absorption characteristic rising from a lower frequency region than the single sound absorption structure, and has the maximum sound absorption coefficient of about 0.92 in a frequency band of 1800 Hz or higher. In addition, it may be confirmed that the heterogeneous sound absorption structure has no large falling width of the sound absorption coefficient in the frequency band of the frequency or more showing the maximum sound absorption coefficient, and has a sound absorption performance of 0.75 or more. Meanwhile, it may be confirmed that the single sound absorption structure has the maximum sound absorption coefficient of 0.97 in the frequency band of about 1900 Hz, but the sound absorption performance is drastically reduced in the frequency band of 1900 Hz or higher and has the sound absorption performance less than 0.5 in the frequency band of 3000 Hz or higher. Therefore, it may be confirmed that the heterogeneous sound absorption structure may be used to absorb wideband sound waves.

Figure 9:
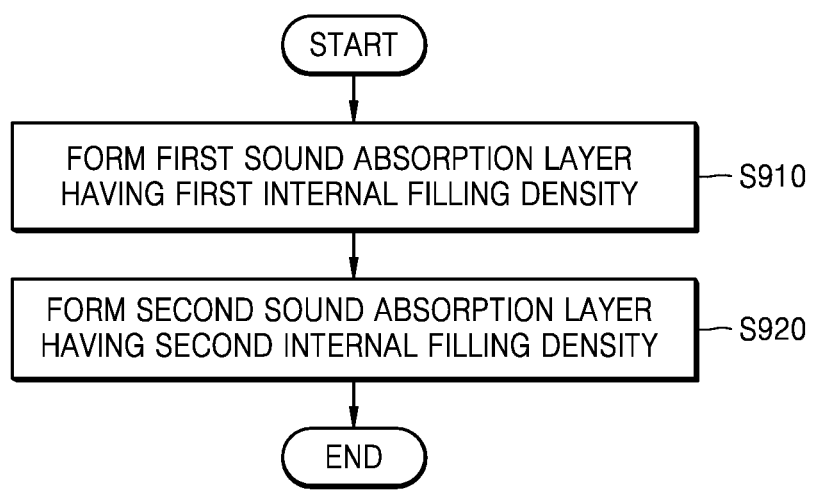
FIG. 9 is a flowchart illustrating a method of manufacturing a sound absorption structure according to an embodiment.

FIG. 9 is a flowchart illustrating a method of manufacturing a sound absorption structure according to an embodiment.

A first sound absorption layer having a first internal filling density is formed (S910). The first sound absorption layer may be formed by arranging a plurality of first elements in three dimensions. The first elements may have a long bar shape. The first elements may be spaced apart in parallel in a direction parallel to a thickness direction of the sound absorption structure, and longitudinal directions of the first elements may be misaligned in the thickness direction of the sound absorption structure. The first elements arranged in the thickness direction of the sound absorption structure may have the longitudinal directions that sequentially change. A degree of change in the longitudinal direction may be 30 degrees or more and 150 degrees or less, and the degree of change in the longitudinal direction may or may not be constant.

The first internal filling density is determined according to the thickness of the first element, the arrangement interval between the first elements, a degree of change in the longitudinal direction of the first elements, etc., and may be 20% or more and less than 100%. Preferably, the first internal filling density may be 20% or more and less than 80%. The center frequency band of sound waves absorbed by the first sound absorption layer may vary according to the first internal filling density. The first sound absorption layer may be formed by a 3D printing technique.

Then, a second sound absorption layer having a second internal filling density different from the first internal filling density is formed on the first sound absorption layer (S920). The second sound absorption layer may be formed by arranging a plurality of second elements in three dimensions. The second elements may have a long bar shape. The second elements may be spaced apart in parallel in the direction parallel to the thickness direction of the sound absorption structure, and longitudinal directions of the second elements may be misaligned in the thickness direction of the sound absorption structure. The second elements arranged in the thickness direction of the sound absorption structure may have the longitudinal directions that sequentially change. A degree of change in the longitudinal direction may be 10 degrees or more and 150 degrees or less, and the degree of change in the longitudinal direction may or may not be constant.

The second internal filling density may be different from the first internal filling density. The second internal filling density is determined according to the thickness of the second element, the arrangement interval between the second elements, a degree of change in the longitudinal direction of the second elements, etc., and may be 10% or more and less than 100%. The center frequency band of sound waves absorbed by the second sound absorption layer may vary according to the second internal filling density. The second sound absorption layer may be formed by the 3D printing technique.

The sound absorption structure is formed by stacking a plurality of layers having different internal filling densities, and thus absorption sound waves of a wide frequency band.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A sound absorption structure comprising:
   a first sound absorption layer comprising first elements arranged respectively in multiple planes so that longitudinal directions thereof in a first plane of the multiple planes are misaligned in a thickness direction of the sound absorption structure with longitudinal directions thereof in a second plane of the multiple planes, the first sound absorption layer having a first internal filling density and absorbing sound waves of a first reactance frequency; and
   a second sound absorption layer disposed on the first sound absorption layer, having a second internal filling density different from the first internal filling density, and absorbing sound waves of a second reactance frequency different from the first reactance frequency,
   wherein the first reactance frequency is less than the second reactance frequency when the first internal filling density is greater than the second internal filling density, and
   wherein the sound absorption structure has a sound absorption performance of 0.75 or more in the frequency band of 1800 Hz or higher.

2. The sound absorption structure of claim 1, wherein ones of the first elements that are arranged perpendicularly to the thickness direction of the sound absorption structure from among the first elements are parallel to one other.

3. The sound absorption structure of claim 1, wherein ones of the first elements that are arranged perpendicularly to the thickness direction of the sound absorption structure from among the first elements are spaced apart from one other.

4. The sound absorption structure of claim 1, wherein the longitudinal directions of ones of the first elements that are arranged perpendicularly to the thickness direction of the sound absorption structure from among the first elements sequentially change in the thickness direction of the sound absorption structure.

5. The sound absorption structure of claim 4, wherein a degree of change in the longitudinal directions is constant.

6. The sound absorption structure of claim 4, wherein a degree of change in the longitudinal directions is greater than or equal to 10 degrees and less than 150 degrees.

7. The sound absorption structure of claim 1, wherein at least one of the first elements has a bar shape.

8. The sound absorption structure of claim 1, wherein the second sound absorption layer comprises second elements of which longitudinal directions are misaligned in the thickness direction of the sound absorption structure.

9. The sound absorption structure of claim 8, wherein a degree of misalignment of the longitudinal directions of the second elements is different from a degree of misalignment of the longitudinal directions of the first elements.

10. The sound absorption structure of claim 8, wherein at least one of a thickness, an arrangement interval, and a material of the first elements is respectively different from at least one of a thickness, an arrangement interval, and a material of the second elements.

11. The sound absorption structure of claim 8, wherein one of the first sound absorption layer and the second sound absorption layer comprises a plurality of spiral pores in the thickness direction of the sound absorption structure, and another one of the first sound absorption layer and the second sound absorption layer comprises a plurality of rectilinear pores in the thickness direction of the sound absorption structure.

12. The sound absorption structure of claim 1, further comprising:
a third sound absorption layer disposed on the second sound absorption layer and having a third internal filling density different from the first and second internal filling densities.

13. The sound absorption structure of claim 12, wherein the third internal filling density is between the first internal filling density and the second internal filling density.

* * * * *